(12) United States Patent
Henttonen et al.

(10) Patent No.: US 11,160,130 B2
(45) Date of Patent: Oct. 26, 2021

(54) USER EQUIPMENT MEASUREMENTS UPON SECONDARY RADIO LINK FAILURE FOR LONG TERM EVOLUTION—NEW RADIO TIGHT INTERWORKING

(71) Applicant: Nokia Technologies Oy, Espoo (FI)

(72) Inventors: Tero Henttonen, Espoo (FI); Benoist Pierre Sebire, Tokyo (JP); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 26 days.

(21) Appl. No.: 16/609,942

(22) PCT Filed: May 4, 2018

(86) PCT No.: PCT/IB2018/053132
§ 371 (c)(1),
(2) Date: Oct. 31, 2019

(87) PCT Pub. No.: WO2018/203306
PCT Pub. Date: Nov. 8, 2018

(65) Prior Publication Data
US 2020/0059985 A1 Feb. 20, 2020

Related U.S. Application Data

(60) Provisional application No. 62/501,410, filed on May 4, 2017.

(51) Int. Cl.
*H04W 76/18* (2018.01)
*H04W 76/15* (2018.01)
(Continued)

(52) U.S. Cl.
CPC .......... *H04W 76/18* (2018.02); *H04W 24/08* (2013.01); *H04W 24/10* (2013.01); *H04W 76/11* (2018.02);
(Continued)

(58) Field of Classification Search
None
See application file for complete search history.

(56) References Cited

U.S. PATENT DOCUMENTS

| | | | |
|---|---|---|---|
| 2015/0223282 A1* | 8/2015 | Vajapeyam | H04L 1/20 370/221 |
| 2016/0219604 A1 | 7/2016 | Fujishiro et al. | |

(Continued)

FOREIGN PATENT DOCUMENTS

WO 2017/014229 A1 1/2017

OTHER PUBLICATIONS

Extended European Search Report received for corresponding European Patent Application No. 18794695.9, dated Nov. 20, 2020, 14 pages.

(Continued)

*Primary Examiner* — Saad Khawar
(74) *Attorney, Agent, or Firm* — Nokia Technologies Oy

(57) ABSTRACT

Systems, methods, apparatuses, and computer program products relating to Long Term Evolution (LTE)-new radio access technology (NR) tight interworking are provided. One method may include maintaining, by a network node, user equipment (UE) measurement configuration information, deciding on actions for the UE to perform at secondary cell group (SCG) change or secondary radio link failure (S-RLF), and receiving an indication, from the UE, when there is a change in the UE measurement requirements.

8 Claims, 6 Drawing Sheets

(51) Int. Cl.
  *H04W 76/28* (2018.01)
  *H04W 76/11* (2018.01)
  *H04W 24/08* (2009.01)
  *H04W 24/10* (2009.01)
  *H04W 84/20* (2009.01)

(52) U.S. Cl.
  CPC ........... *H04W 76/15* (2018.02); *H04W 76/28* (2018.02); *H04W 84/20* (2013.01)

(56) References Cited

U.S. PATENT DOCUMENTS

| | | | |
|---|---|---|---|
| 2017/0215078 A1* | 7/2017 | Mochizuki | H04W 4/90 |
| 2018/0049269 A1* | 2/2018 | Fujishiro | H04W 76/28 |
| 2018/0192468 A1* | 7/2018 | Martin | H04W 52/0216 |

OTHER PUBLICATIONS

"Report and Summary of Email Discussion [86#29][L TE/DC] RRM Measurements", 3GPP TSG-RAN WG2 Meeting #87, R2-143808, Agenda : 7 .1.3.2, Huawei, Aug. 18-22, 2014, pp. 1-34.
"New WID on New Radio Access Technology", 3GPP TSG-RAN Meeting #75, RP-170847, Agenda: 9.1, NTT Docomo, Inc, Mar. 6-9, 2017, 12 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.1.0, Dec. 2016, pp. 1-317.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.0, Mar. 2017, pp. 1-721.
"3rd Generation Partnership Project; Technical Specification Group Radio Access Network; Study on New Radio Access Technology; Radio Interface Protocol Aspects (Release 14)", 3GPP TR 38.804, V14.0.0, Mar. 2017, pp. 1-57.
"3rd Generation Partnership Project; Technical Specification Group Radio Access Network; Evolved Universal Terrestrial Radio Access (E-UTRA); Requirements for support of radio resource management (Release 14)", 3GPP TS 36.133, V14.3.0, Mar. 2017, pp. 1-2387.
"S-RLF with Tight Interworking", 3GPP TSG-RAN WG2 Meeting #97bis, R2-1702631, Agenda: 10.2.2.2, Nokia, Apr. 3-7, 2017, 5 pages.
"RLM and RLF in case of LTE-NR tight interworking", 3GPP TSG-RAN WG2 Meeting #97bis, R2-1702711, Agenda: 10.2.2.4, Ericsson, Feb. 3-7, 2017, pp. 1-4.
"RLF Procedure for LTE-NR Interworking", 3GPP TSG-RAN WG2 NR #97bis, R2-1703018, Agenda: 10.2.2.4, Samsung, Apr. 3-7, 2017, 3 pages.
"Discussion on split SRB for LTE-NR interworking", 3GPP TSG-RAN WG2 #97bis, R2-1703091, Agenda: 10.2.2.4, KT Corp, Apr. 3-7, 2017, pp. 1-2.
"Faster Measurements and Signaling for Mobility", 3GPP TSG-RAN WG2 #97bis, R2-1702713, Agenda: 10.2.2.4, Ericsson, Apr. 3-7, 2017, pp. 1-5.
"Discussion on NR Beam Management", 3GPP TSG-RAN WG4 #82bis, R4-1702855, Agenda: 10.5.5.1, Nokia, Apr. 3-7, 2017, 5 pages.
"Discussion on NR Connected Mode Requirements", 3GPP TSG-RAN WG4 Meeting#82bis, R4-1702856, Agenda: 10.5.1.1, Nokia, Apr. 3-7, 2017, 5 pages.
International Search Report and Written Opinion received for corresponding Patent Cooperation Treaty Application No. PCT/IB2018/053132, dated Oct. 5, 2018, 16 pages.
"Measurement Coordination for LTE-NR Tight Interworking", 3GPP TSG-RAN WG2 Meeting#97bis, R2-1702693, Agenda: 10.2.2.2, Nokia, Apr. 3-7, 2017, 5 pages.
"LS on Measurement Requirement in Dual Connectivity", 3GPP TSG-RAN WG2 Meeting#86, R2-142281, Samsung, May 19-23, 2014, 1 page.
"SCG Re-establishment in EN-DC", 3GPP TSG-RAN WG2 Meeting#97bis,R2-1703683, Agenda: 10.2.3.3, LG Electronics Inc., Apr. 3-7, 2017, pp. 1-3.
"UE Measurements upon S-RLF for MR-DC", 3GPP TSG-RAN WG2 NR Adhoc#2, R2-1706855, Agenda: 10.2.9, Nokia, Jun. 27-29, 2017, 2 pages.
"Further Considerations on UE Measurements upon S-RLF", 3GPP TSG-RAN WG2 #99, R2-1709246, Agenda: 10.2.9, Nokia, Aug. 21-25, 2017, 3 pages.

* cited by examiner

USER EQUIPMENT MEASUREMENTS UPON SECONDARY RADIO LINK FAILURE FOR LONG TERM EVOLUTION—NEW RADIO TIGHT INTERWORKING

RELATED APPLICATION

This application was originally filed as PCT Application No. PCT/IB2018/053132, filed on May 4, 2018, which claims priority from U.S. Provisional Application No. 62/501,410, filed on May 4, 2017.

CROSS REFERENCE TO RELATED APPLICATIONS

This application claims priority from U.S. Provisional Application No. 62/501,410, filed on May 4, 2017. The entire contents of this earlier filed application are hereby incorporated by reference in their entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to LTE-NR tight interworking.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation (5G) or new radio (NR) wireless systems refer to the next generation (NG) of radio systems and network architecture. It is estimated that 5G will provide bitrates on the order of 10-20 Gbit/s. 5G will support at least enhanced mobile broadband (eMBB) and ultra-reliable low-latency-communication (URLLC). 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a next generation node B (gNB).

SUMMARY

One embodiment is directed to a method that may include maintaining, by a network node, user equipment (UE) measurement configuration information, deciding on actions for the user equipment (UE) to perform at secondary cell group (SCG) change or secondary radio link failure (S-RLF), and receiving an indication, from the user equipment (UE), when there is a change in the user equipment (UE) measurement requirements.

Another embodiment is directed to an apparatus that may include at least one processor and at least one memory including computer program code. The at least one memory and the computer program code are configured, with the at least one processor, to cause the apparatus at least to maintain user equipment (UE) measurement configuration information, decide on actions for the user equipment (UE) to perform at secondary cell group (SCG) change or secondary radio link failure (S-RLF), and receive an indication, from the user equipment (UE), when there is a change in the user equipment (UE) measurement requirements.

Another embodiment is directed to an apparatus that may include maintaining means for maintaining user equipment (UE) measurement configuration information, deciding means for deciding on actions for the user equipment (UE) to perform at secondary cell group (SCG) change or secondary radio link failure (S-RLF), and receiving means for receiving an indication, from the user equipment (UE), when there is a change in the user equipment (UE) measurement requirements.

Another embodiment is directed to a non-transitory computer readable medium comprising program instructions stored thereon for performing at least the following: maintaining user equipment (UE) measurement configuration information, deciding on actions for the user equipment (UE) to perform at secondary cell group (SCG) change or secondary radio link failure (S-RLF), and receiving an indication, from the user equipment (UE), when there is a change in the user equipment (UE) measurement requirements.

Another embodiment is directed to a method that may include, when secondary radio link failure (S-RLF) is detected, requesting, by a network node, a user equipment (UE) to indicate certain information within an uplink message to the network node, and indicating whether a certain measurement event is fulfilled for any new radio (NR) neighbor cell or whether the user equipment (UE) is able detect at least one new radio (NR) cell that meets the measurement event entry condition.

Another embodiment is directed to an apparatus that may include at least one processor and at least one memory including computer program code. The at least one memory and the computer program code are configured, with the at least one processor, to cause the apparatus at least to, when secondary radio link failure (S-RLF) is detected, request a user equipment (UE) to indicate certain information within an uplink message to the apparatus, and indicate whether a certain measurement event is fulfilled for any new radio (NR) neighbor cell or whether the user equipment (UE) is able detect at least one new radio (NR) cell that meets the measurement event entry condition.

Another embodiment is directed to an apparatus that may include, when secondary radio link failure (S-RLF) is detected, requesting means for requesting a user equipment (UE) to indicate certain information within an uplink message to the apparatus, and indicating means for indicating whether a certain measurement event is fulfilled for any new radio (NR) neighbor cell or whether the user equipment (UE) is able detect at least one new radio (NR) cell that meets the measurement event entry condition.

Another embodiment is directed to a non-transitory computer readable medium comprising program instructions stored thereon for causing an apparatus to perform at least the following: when secondary radio link failure (S-RLF) is detected, requesting a user equipment (UE) to indicate certain information within an uplink message to the apparatus, and indicating whether a certain measurement event is fulfilled for any new radio (NR) neighbor cell or whether the user equipment (UE) is able detect at least one new radio (NR) cell that meets the measurement event entry condition.

Another embodiment is directed to a method that may include, in a long term evolution-new radio (LTE-NR) configuration, after a secondary radio link failure (S-RLF), continuing, by a user equipment (UE), measurements according to current requirements, and sending and indication of the results of the measurements to at least one of a master network node and a secondary network node.

Another embodiment is directed to an apparatus that may include at least one processor and at least one memory including computer program code. The at least one memory and the computer program code are configured, with the at least one processor, to cause the apparatus at least to, in a long term evolution-new radio (LTE-NR) configuration, after a secondary radio link failure (S-RLF), continue measurements according to current requirements, and sending an indication of the results of the measurements to at least one of a master network node and secondary network node.

Another embodiment is directed to an apparatus that may include, in a long term evolution-new radio (LTE-NR) configuration, after a secondary radio link failure (S-RLF), means for continuing measurements according to current requirements, and sending an indication of the results of the measurements to at least one of a master network node and secondary network node.

Another embodiment is directed to a non-transitory computer readable medium comprising program instructions stored thereon for causing an apparatus to perform at least the following: in a long term evolution-new radio (LTE-NR) configuration, after a secondary radio link failure (S-RLF), continuing measurements according to current requirements, and sending an indication of the results of the measurements to at least one of a master network node and secondary network node.

BRIEF DESCRIPTION OF THE DRAWINGS

For proper understanding of the invention, reference should be made to the accompanying drawings, wherein.

DETAILED DESCRIPTION

Figure 1:
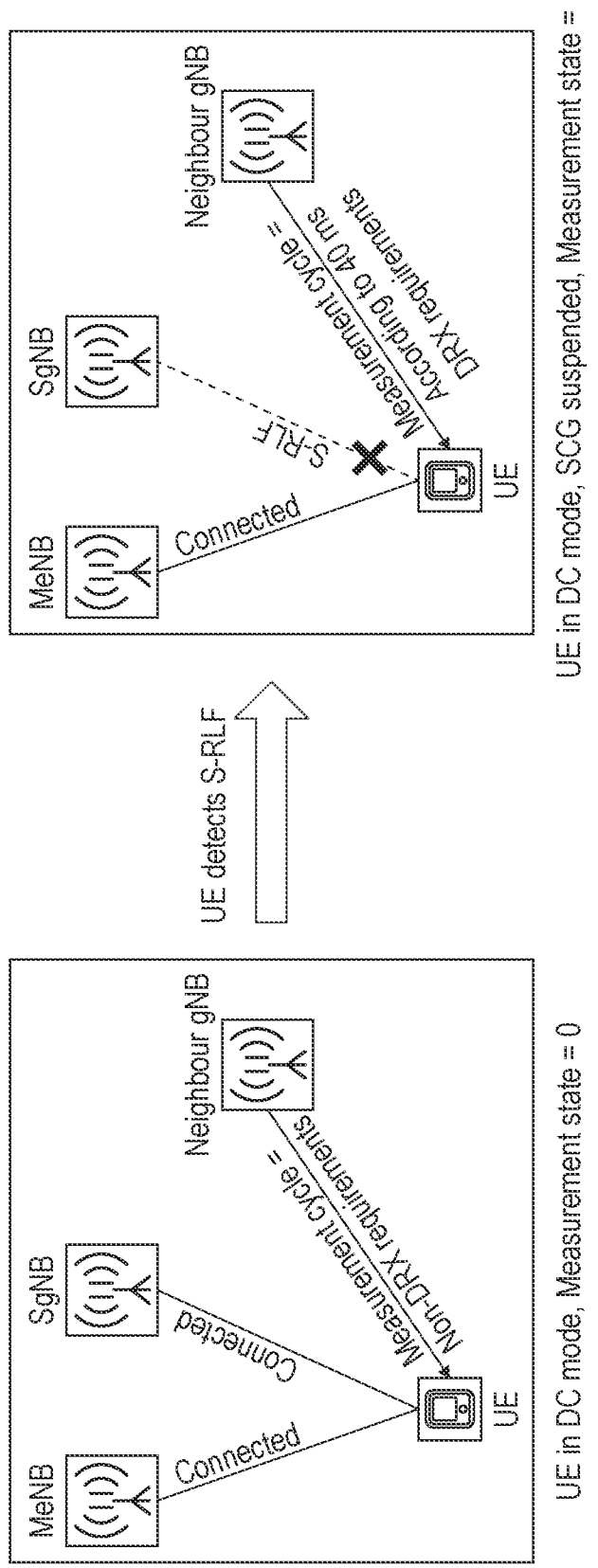
FIG. 1 illustrates an example system diagram, according to an embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to Long Term Evolution (LTE)-new radio access technology (NR) tight interworking, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As introduced above, certain embodiments may relate to LTE-NR tight interworking. 3GPP is currently working on defining so-called LTE-NR tight interworking (also known as E-UTRAN-NR Dual Connectivity or EN-DC) as a possible early deployment option of NR technology. The NR may be used together with E-UTRAN in a similar manner as 3GPP Rel-12 LTE DC was designed. In this case, the LTE master eNB (MeNB) may control the LTE radio resources and the overall LTE-NR connection, whereas the NR secondary gNB (SgNB) may control the air interface resources of the NR radio.

In LTE dual connectivity (DC), the MeNB controls the control plane of the RRC connection and is in charge of the overall radio resource management including the setup/modification/release of radio measurements on behalf of the radio resources managed by the SeNB, but the secondary eNB (SeNB) decides on the actual radio configuration related parameters configured for the UE over the SeNB air interface. Only the MeNB can decide which cells to add to the MeNB/SeNB. There is also only one RRC state, which is maintained by the MeNB. The RRC messages are created and be sent only by the MeNB and the MeNB may comprehend the entire RRC configuration sent to the UE, including the configuration decided by the SeNB.

Similarly, with EN-DC the MeNB is in charge of setting up the LTE-NR connectivity, and the SgNB decides on its own radio parameters, however there are some differences between LTE DC and EN-DC. For example, in EN-DC, the MeNB is not required to comprehend the configuration of the SgNB (a reason being that LTE and NR are quite different radio access technologies in contrast with LTE DC wherein both the MeNB and SeNB were implementing the radio protocols from the same RAT, i.e., LTE); the SgNB may have a separate RRC entity that is responsible for configuring the NR part of the LTE-NR configuration directly without MeNB being involved and the SgNB can send RRC messages directly to the UE; the SgNB is in charge of the measurement configuration involving the NR measurements and more specific NR measurements (e.g., for beamforming) and also the mobility of the UE within the NR, and the MeNB is not required to comprehend the NR measurement configuration; the change of SgNB cells may be initiated by the currently configured SgNB; and UE measurements may also be configured after a coordination procedure between the MeNB and SgNB using the enhanced X2 (Xx) interface. The coordination, at least, involves agreeing upon the measurement configurations for the frequencies other than the serving frequencies under control of the SgNB. Some additional aspects of the coordination may also involve coordinating fine grained details on the total number of measurement objects, measurement reporting configuration and measurement event identities that will be configured at the UE. Finally, it should be noted that the coverage of a SgNB may be spotty for a lengthy time to come because 5G coverage will not yet be ubiquitous, and because the 5G may be operating in high frequency bands where the radio wave propagation may be more vulnerable to changes in radio conditions due to e.g. change in Line-of-Sight (LOS) conditions for the carrier.

In LTE DC, a UE monitors the radio quality of the SeNB PSCell via similar radio link monitoring (RLM) procedures as for MeNB PCell. This is called secondary radio link monitoring (S-RLM) and the occurrence of UE detecting the radio link failure (RLF) of PSCell is referred to as secondary RLF (S-RLF). When S-RLF occurs, the UE stops utilizing the radio resources of the SeNB (i.e., suspends the Secondary Cell Group (SCG) by no longer attempting to receive DL or send UL towards the SeNB) and indicates the failure to MeNB via uplink (using the message "secondary cell group (SCG) failure report"), but still continues to measure SCell(s) of the SeNB in the same manner as before S-RLF. The measurements are performed as per the activation status of the SCells prior to S-RLF, which means the UE may be using either activated or deactivated SCell requirements for the measurements. In case the UE is using deactivated SCell measurement requirements, the UE is not required to measure the deactivated SCells as frequently as activated SCells, as controlled by the RRC parameter measCycleSCell-r10 (which is configured in MeasObject-EUTRA for each SCell frequency). The measCycleSCell parameter is used only when an SCell is configured on the frequency indicated by the measObject and is in deactivated state (e.g., see 3GPP TS 36.133). E-UTRAN configures the parameter whenever an SCell is configured on the frequency indicated by the measObject, but the field may also be signalled when an SCell is not configured. Value sf160 corresponds to 160 sub-frames, sf256 corresponds to 256 sub-frames and so on.

However, this means that upon S-RLF, UE continues measuring the SCell carriers in the same way as before. In LTE DC, this was not considered to be a large problem since it was up to MeNB to act according to the S-RLF indication ("SCG failure report"), and MeNB was fully aware of the UE measurement configuration and was controlling the SeNB SCell mobility fully, and was able to react to the occurrence of the S-RLF. However, with LTE-NR DC, the SgNB is in control of the mobility, and the SgNB leg may also fail differently due to, for example, the beam management procedures with higher carrier frequencies or due to LOS blockage occurring.

Also, since the SgNB is responsible for handling the mobility within the NR system and the MeNB may not even comprehend the measurement events configured by the SgNB, the MeNB may not fully be aware of how to even react to the S-RLF indication received from the UE. For example, as one approach, the MeNB may just forward the indication to SgNB and wait for SgNB to react. However, this approach may be prone to latency due to triggering of the measurement coordination procedure with the SgNB upon the radio link failure. Further, the SgNB may simply choose to wait for a while to see if the link to the UE would eventually recover. As another approach, the MeNB may immediately de-configure the SgNB and assign new measurements to decide later which SgNB to add. In practice, this alternative means that the MeNB must interrupt the UE with an updated measurement configuration, which may cause UE to use the LTE radio receiver resources rather than exploiting the NR radio receiver (it is agreed that the baseline assumption for EN-DC is 2 receivers (Rx), 2 transmitters (Tx)). The NR receiver chain performing measurements may be preferable over LTE receiver chain making the same measurements because of more modern signal processing implementation, and the configuration of the NR receiver for measurements allows obtaining measurement samples in a faster and more efficient manner. In yet another approach, the MeNB may request specific actions from SgNB (e.g., release of SCG, SCG change). This also means that the SgNB must provide a measurement configuration different from the one the UE is using (e.g., ask UE to measure other frequencies because the SgNB starts transmitting (Tx) on frequencies that were turned off due to inactivity).

One problem here relates to the information received from the UE. If the UE continues measuring but is not able to send measurement reports to SgNB, the UE continues measuring but SgNB may not be able to act upon the received information. Further, if the SCells are deactivated immediately to allow lower power consumption at UE, the UE may not have the chance to react to the S-RLF in a timely manner by indicating new measurements to MeNB/SgNB, as the UE is reducing its measurement activity. This can delay the handover unnecessarily and can lead to performance decrease for the LTE-NR operation, especially since the coverage of NR cells may be small and too early handovers may not desirable. Therefore, some mechanism for recovering gracefully from the S-RLF during LTE-NR operation is desirable.

One embodiment is directed to gradually loosening the UE measurement requirements after S-RLF in one or more steps (e.g., the measurement requirements become less stringent gradually, for example, based on timer), until they reach the same or similar (looser) requirements as are used for, e.g., idle mode, discontinuous reception, or the like. In some embodiments, this may be either configured by the SgNB at the same time as the LTE-NR configuration is initialized, or there may be a default behaviour for the UE in case the SgNB agrees to let the UE use looser requirements immediately. In certain embodiments, this may also involve indicating the change in requirements to a MeNB via, for example, a SCG failure message.

Alternatively, in an embodiment, the S-RLF indication may include information on which cell a UE would consider to be a suitable SgNB candidate. For example, a "best cell" indication from the UE could be included. In an embodiment, the sending of a "best cell" indication may include beam level results depending on how the UE is configured. The UE may also indicate immediately whether the coverage conditions for the NR, e.g., the number of detected NR cells and their desired measurement quantities. This may be, for example, information embedded within the secondary cell group (SCG) failure report or a separate measurement report triggered upon S-RLF detection.

In one embodiment, a UE may be responsible for S-RLF detection and measurements according to SgNB and/or MeNB configuration. For example, according to an embodiment, when S-RLF occurs, a UE may start a timer, which is referred to as $T_{meas}$ in the present disclosure. While the $T_{meas}$ timer is running, the UE may continue measurements according to "activated SCell" requirements, i.e., nothing changes after S-RLF detection. When the $T_{meas}$ expires, the UE may start utilizing measurement requirements according to different requirements. For instance, these may be "deactivated SCell" requirements or "DRX cycle=x ms" requirements. This alteration of measurement requirements may occur one or more times. For example, according to an embodiment, the UE may change its requirements in one or more steps towards the "looser" requirements until it reaches the "loosest" defined requirements.

According to certain embodiments, The UE may store the transitions happening across different phases in a local buffer which may be optionally sent to the network in an uplink message. Each time the UE changes its measurement requirements, the UE may propose and/or indicate this to the MeNB and SgNB (e.g., via the MeNB leg). Upon start of the timer $T_{meas}$, the UE may also send an indication to MeNB and/or SgNB of the current measurement results of detected cells. This indication may include, for example, the number of detected cells and their received power levels, suggested SgNB PCI/GCID along with measurement information, or an indication that no cell is detected at measured NR frequencies. In some embodiments, the UE may be commanded by the network to follow its proposal or follow another track by the network.

In some embodiments, a measurement coordination procedure may be executed between the MeNB and SgNB to agree on how the UE performs measurements during a S-RLF. The same coordination may be reused, in the future, to tackle RLF from either the MeNB or the SgNB. It should be noted that the SgNB may refer to a standalone node which implements the full radio protocol stack components or it may refer to a centralized architecture wherein the control plane is centrally located. As such, the policy for RLF handling should come from such a node. In this context, a SgNB may be responsible for maintaining the UE measurement configuration and deciding on actions to perform SCG change (i.e., request UE to connect to a different SgNB to resume LTE-NR operation after S-RLF).

According to certain embodiments, the SgNB may configure the timer $T_{meas}$ value used by the UE, as well as indicate which measurement requirements to use (e.g., via indicating a measurement DRX cycle) to the UE. In an embodiment, the SgNB may also configure what the UE indicates in the SCG failure report, e.g., whether the UE indicates full measurement information of detected cells, just the number of detected cell (if any), or whether the UE should attempt to retrieve, e.g., GCID of detected cells for the report. The SgNB may also indicate threshold values to be used by the UE for the purpose of S-RLF monitoring.

In some embodiments, the MeNB may also request the UE to indicate certain information upon S-RLF detection within uplink message to MeNB (e.g., the SCG failure report or a measurement report). This could be, for example, in the form of indicating whether a certain measurement event (e.g., B1) is fulfilled for any NR neighbour cell, or whether the UE can detect any NR cell at all (i.e. simple Boolean indication of "Yes/No" for ay detected NR cells) that meet the B1 entry condition.

As an alternative to the timer $T_{meas}$ discussed above, the UE may continue to do measurements according to "activated SCell" requirements as long as not instructed to do otherwise, by either the MeNB or the SgNB. Table 1 shows an example of configured measurement states including the state identifier, measurement cycle and state duration. For ease of understanding, Table 2 below uses example names for the states introduced in Table 1.

TABLE 1

Example of measurement states after S-RLF

| State Identifier | Measurement Cycle | State Duration |
| --- | --- | --- |
| 0 | Non-DRX | Until S-RLF |
| 1 | 40 ms | 1 s |
| 2 | 80 ms | 2 s |
| 3 | 320 ms | Infinity |

TABLE 2

Example naming to describe the measurement states

| State Identifier | Description |
| --- | --- |
| 0 | "Activated SCell" |
| 1 | "Non-DRX SCell" |

TABLE 2-continued

Example naming to describe the measurement states

| State Identifier | Description |
| --- | --- |
| 2 | "Light DRX SCell" |
| 3 | "Idle DRX SCell" |

Figure 2:
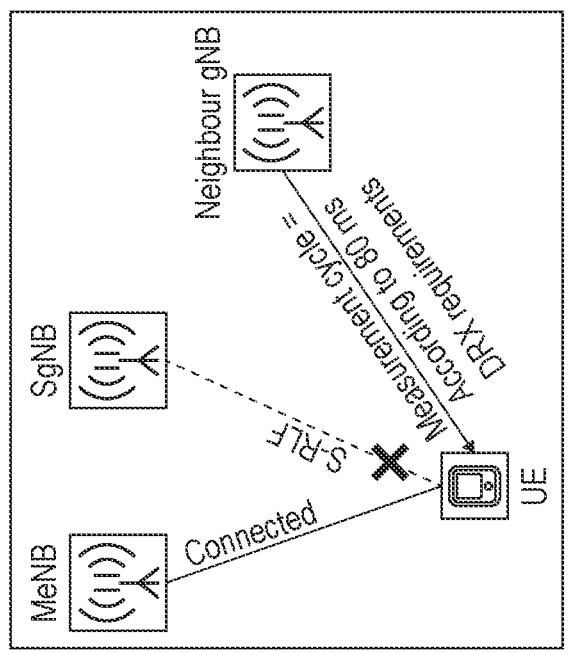
FIG. 2 illustrates an example system diagram, according to an embodiment.
Figure 2:
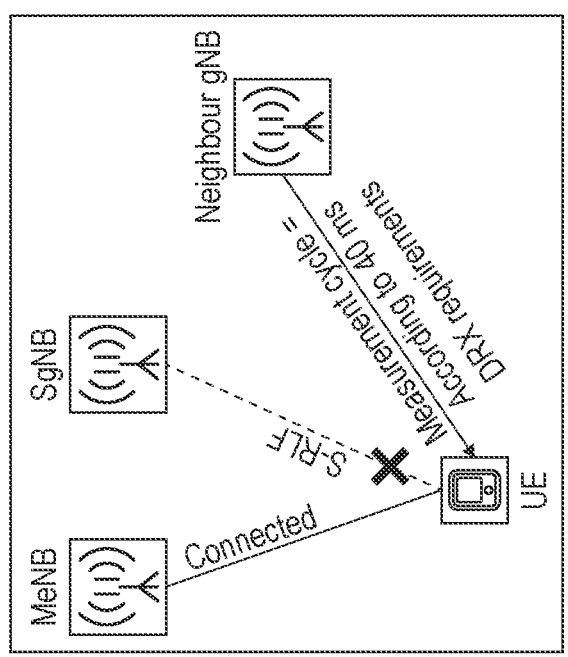
Figure 3:
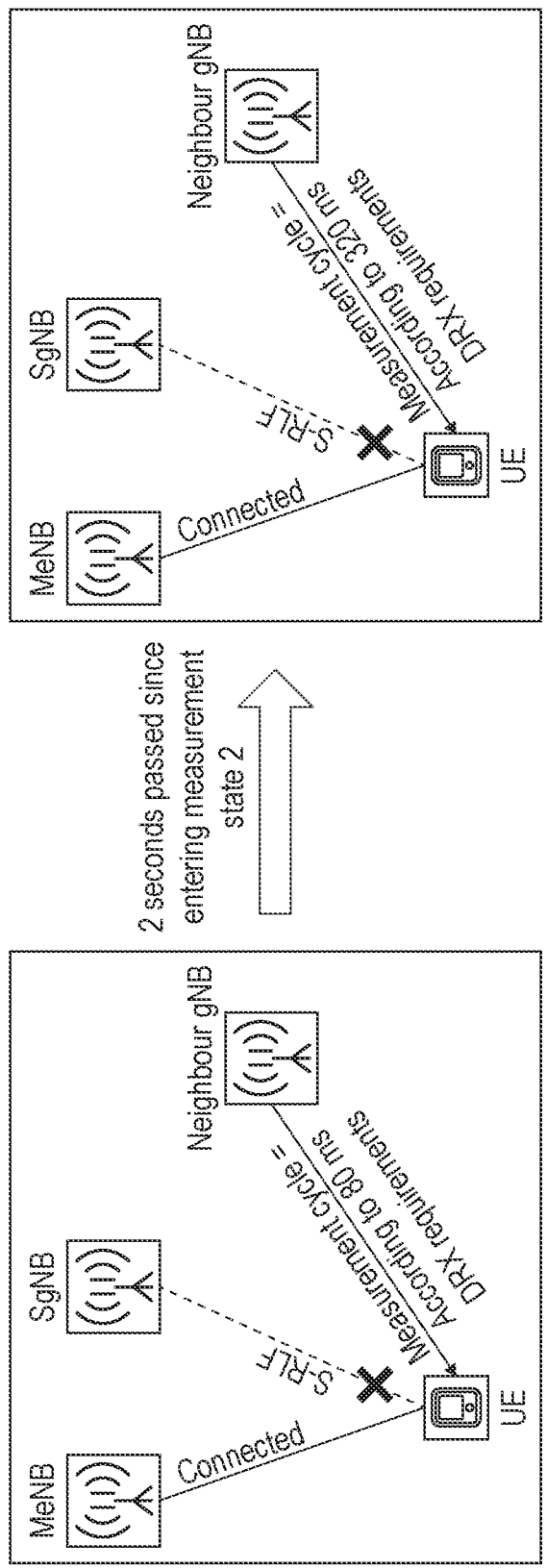
FIG. 3 illustrates an example system diagram, according to an embodiment.

FIGS. 1-3 illustrate examples of system diagrams depicting how a UE moving from one measurement state to another. In the examples of FIGS. 1-3, state 1 represents measurements still according to normal activated SCell handling, state 2 represents loosening of measurement requirements but still measuring more frequently than requirements for deactivated SCells, and state 3 represents measurements done according to requirements for deactivated SCells.

FIG. 1 illustrates an example system diagram depicting a UE transition from a normal measurement state (measurement state=0) to a first measurement state (measurement state=1) after SCG failure. FIG. 2 illustrates an example system diagram depicting the UE transition from the first measurement state to looser measurements (measurement state=2) after SCG failure. FIG. 3 illustrates an example system diagram depicting the UE transition from the second measurement state (measurement state=2) to deactivated SCell measurements state (measurement state=3).

Figure 4A:
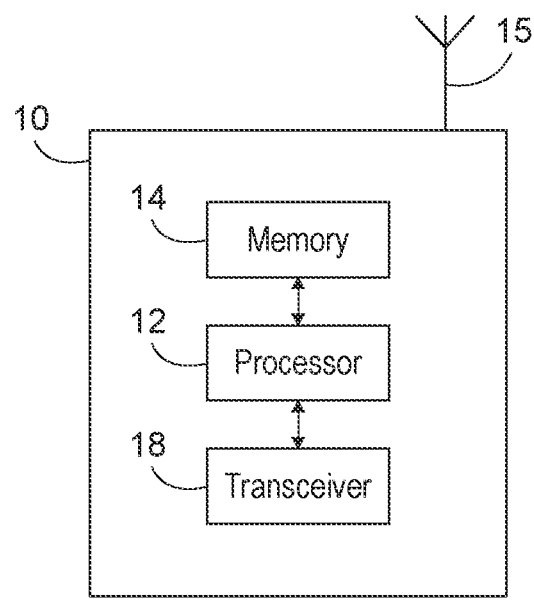
FIG. 4a illustrates an example block diagram of an apparatus, according to an embodiment.

FIG. 4a illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 4a.

As illustrated in FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, node B, eNB, 5G or new radio node B (gNB) or access point, WLAN access point, or the like. For example, in certain embodiments, apparatus 10 may be a MeNB and/or SgNB in a LTE-NR configuration. According to certain embodiments, apparatus 10 may be controlled by memory 14 and processor 12 to perform the functions associated with any of the embodiments described herein.

According to an embodiment, apparatus 10 may be a SgNB. In this embodiment, apparatus 10 may be controlled by memory 14 and processor 12 to maintain a UE measurement configuration information and to decide on actions for the UE to perform at S-RLF or SCG change. For example, in one embodiment, apparatus 10 may be controlled by memory 14 and processor 12 to request the UE to connect to a different SgNB to resume LTE-NR operation after S-RLF. According to certain embodiments, apparatus 10 may be controlled by memory 14 and processor 12 to receive an indication, from the UE, when there is a change in the UE measurement requirements.

In some embodiments, apparatus 10 may be controlled by memory 14 and processor 12 to configure the UE with a value for a timer that may be used by the UE to change measurement requirements. In an embodiment, upon start of the timer, apparatus 10 may be controlled by memory 14 and processor 12 to receive an indication, from the UE, of current measurement results of detected cells. In certain embodiments, apparatus 10 may be controlled by memory 14 and processor 12 to send a command, to the UE, to indicate which measurement requirements the UE should use (e.g., indicating a measurement DRX cycle). In an embodiment, apparatus 10 may also be controlled by memory 14 and processor 12 to configure what the UE indicates in a SCG failure report, such as whether the UE indicates full measurement information of detected cells, just the number of detected cell (if any), or whether the UE should attempt to retrieve, e.g., GCID of detected cells for the report. According to one embodiment, apparatus 10 may also be controlled by memory 14 and processor 12 to indicate threshold values to be used by the UE for the purpose of S-RLF monitoring.

In another embodiment, apparatus 10 may be a MeNB. In this embodiment, apparatus 10 may be controlled by memory 14 and processor 12 to request a UE to indicate certain information upon S-RLF detection within uplink message to apparatus 10 (e.g., the SCG failure report or a measurement report). In one embodiment, apparatus 10 may be controlled by memory 14 and processor 12 to indicate whether a certain measurement event is fulfilled for any NR neighbour cell, or whether the UE can detect any NR cell at all (i.e., simple Boolean indication of "Yes/No" for ay detected NR cells) that meet the measurement event entry condition.

Figure 4B:
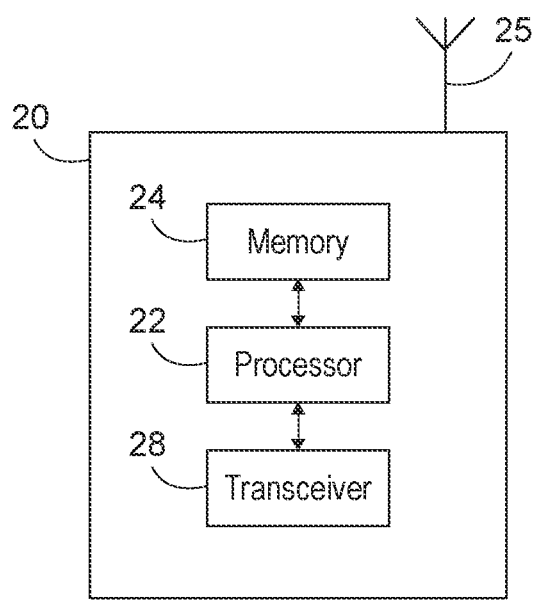
FIG. 4b illustrates an example block diagram of an apparatus, according to another embodiment.

FIG. 4*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, and any other radio access technologies. It should be noted that one of ordinary skill in the art would understand that apparatus 20 may include components or features not shown in FIG. 4*b*.

As illustrated in FIG. 4*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4*b*, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein. According to certain embodiments, in an LTE-NR configuration, apparatus 20 may be controlled by memory 24 and processor 22 to, after a S-RLF, gradually alter or loosen UE measurement requirements until the measurement requirements reach the loosest defined requirements. For example, in certain embodiments, the UE measurement requirements may be altered or loosened in one or more steps until the measurement requirements reach the same or similar requirement as idle mode, discontinuous reception, or the like.

For instance, to achieve the gradual loosening of the UE measurement requirements, in an embodiment, when S-RLF occurs, apparatus 20 may be controlled by memory 24 and processor 22 to start a timer, $T_{meas}$, and, while the $T_{meas}$ timer is running, apparatus 20 may be controlled by memory 24 and processor 22 to continue measurements according to the current requirement (i.e., nothing changes after S-RLF detection), such as for example, the "activated SCell" requirements. In some embodiments, upon start of $T_{meas}$ timer, apparatus 20 may be controlled by memory 24 and processor 22 to send an indication to a MeNB and/or SgNB of the current measurement results of detected cells. This may include, for example, the number of detected cells and their received power levels, suggested SgNB PCI/GCID along with measurement information, or an indication that no cell is detected at measured NR frequencies.

According to certain embodiments, when the $T_{meas}$ expires, apparatus 20 may be controlled by memory 24 and processor 22 to start utilizing different measurement requirements, such as "deactivated SCell" requirements or "DRX cycle=x ms" requirements. In an embodiment, apparatus 20 may be controlled by memory 24 and processor 22 to alter the measurement requirements one or more times or in one or more steps towards "looser" requirements.

In some embodiments, apparatus 20 may be controlled by memory 24 and processor 22 to store the transitions happening across different phases in a local buffer which may be optionally sent to the network in an uplink message. For example, each time apparatus 20 changes its measurement requirements, apparatus 20 may be controlled by memory 24 and processor 22 to propose and/or indicate this change to the MeNB and/or SgNB (e.g., via the MeNB leg). According to certain embodiments, apparatus 20 may be controlled by memory 24 and processor 22 to receive a command or indication by the network to follow its own proposal or to follow another track provided by the network.

Figure 5A:
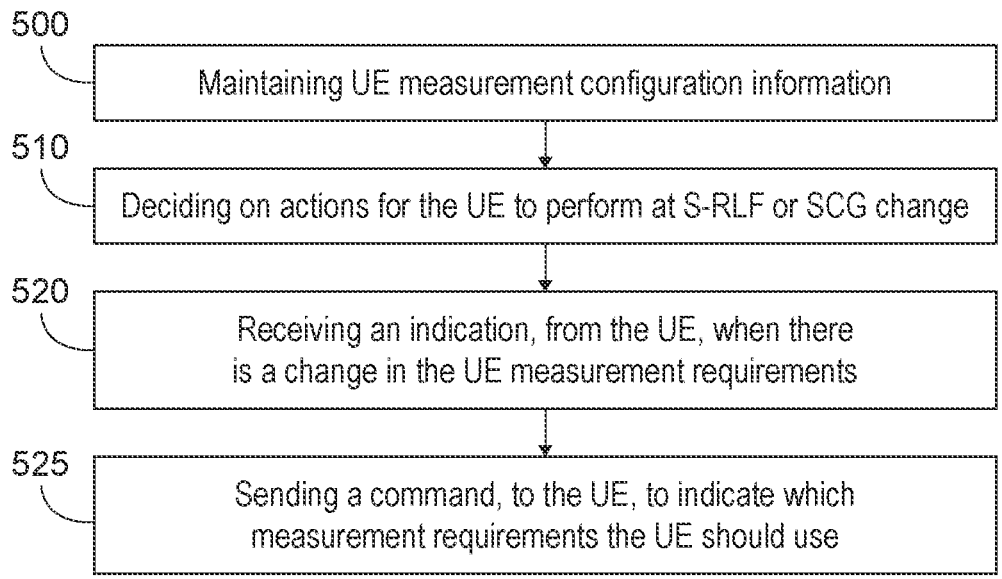
FIG. 5a illustrates an example flow diagram of a method, according to an embodiment.

FIG. 5a illustrates an example flow diagram of a method, according to one embodiment. The method of FIG. 5a may be performed, for example, by a network node, such as a base station, access point, eNB, gNB, or the like. For example, in an embodiment, the method of FIG. 5a may be performed by a SgNB. As illustrated in FIG. 5a, the method may include, at 500, maintaining a UE measurement configuration information and, at 510, deciding on actions for the UE to perform at S-RLF or SCG change. For example, in one embodiment, the method may include requesting the UE to connect to a different SgNB to resume LTE-NR operation after S-RLF. According to certain embodiments, the method may also include receiving, at 520, an indication, from the UE, when there is a change in the UE measurement requirements.

In some embodiments, the method may also include configuring the UE with a value for a timer that may be used by the UE to change measurement requirements. In an embodiment, upon start of the timer, the method may include receiving an indication, from the UE, of current measurement results of detected cells. In certain embodiments, the method may also include, at 525, sending a command, to the UE, to indicate which measurement requirements the UE should use (e.g., indicating a measurement DRX cycle). In an embodiment, the method may also include configuring what the UE indicates in a SCG failure report, such as whether the UE indicates full measurement information of detected cells, just the number of detected cell (if any), or whether the UE should attempt to retrieve, e.g., GCID of detected cells for the report. According to one embodiment, the method may also include indicating threshold values to be used by the UE for the purpose of S-RLF monitoring.

Figure 5B:
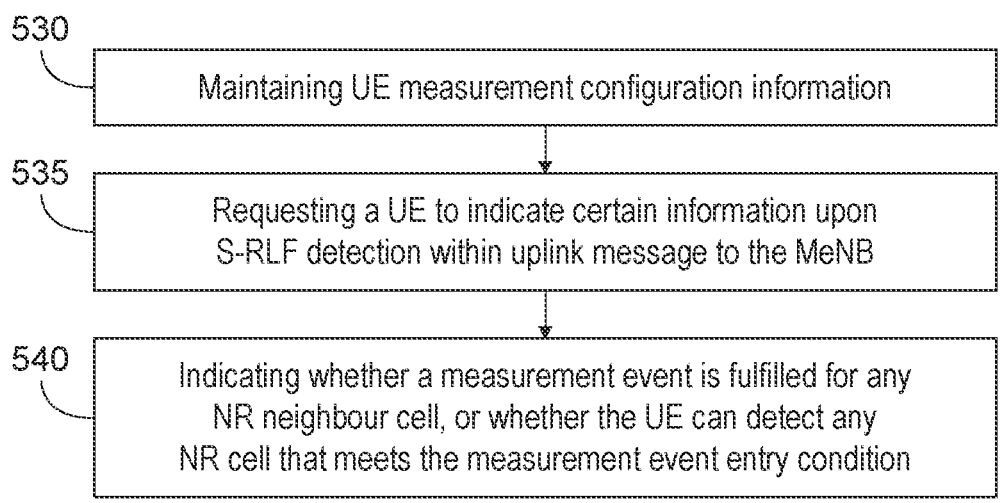
FIG. 5b illustrates an example flow diagram of a method, according to another embodiment.

FIG. 5b illustrates an example flow diagram of a method, according to one embodiment. The method of FIG. 5b may be performed, for example, by a network node, such as a base station, access point, eNB, gNB, or the like. For example, in an embodiment, the method of FIG. 5b may be performed by a MeNB. As illustrated in FIG. 5b, the method may include, at 530, maintaining UE measurement configuration information. When S-RLF is detected on NR, the method may also include, at 535, requesting a UE to indicate certain information upon S-RLF detection within uplink message to the MeNB (e.g., the SCG failure report or a measurement report). In one embodiment, the method may also include, at 540, indicating whether a certain measurement event is fulfilled for any NR neighbour cell, or whether the UE can detect any NR cell at all (i.e., simple Boolean indication of "Yes/No" for any detected NR cells) that meets the measurement event entry condition.

Figure 5C:
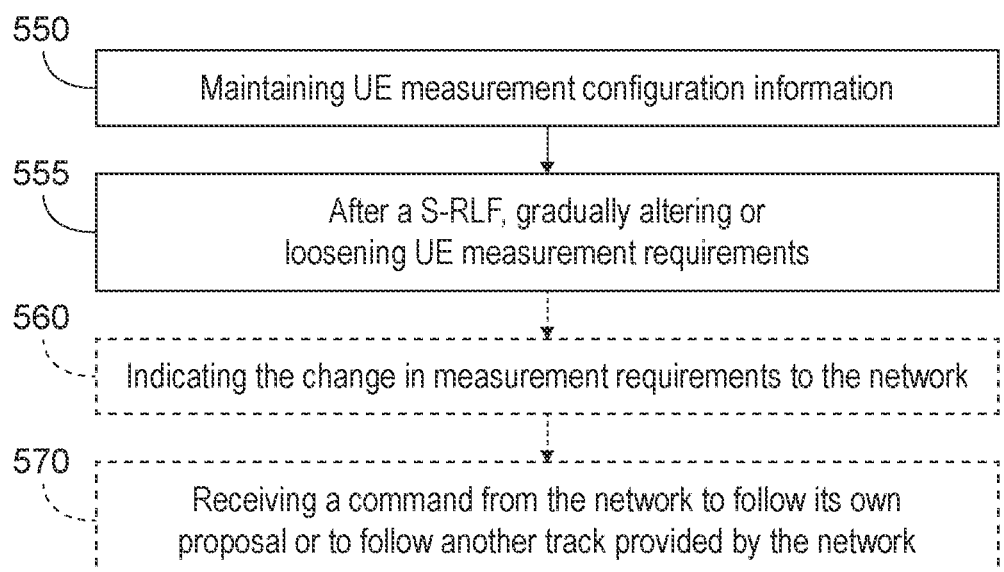
FIG. 5c illustrates an example flow diagram of a method, according to an embodiment.

FIG. 5c illustrates an example flow diagram of a method, according to one embodiment. The method of FIG. 5c may be performed, for example, by a UE, mobile station, mobile device, IoT device, MTC device, or the like. As illustrated in FIG. 5c the method may include, at 550, in an LTE-NR configuration, maintaining UE measurement configuration information. After a S-RLF, the method may include, at 555, gradually altering or loosening UE measurement requirements until the measurement requirements reach the loosest defined requirements. For example, in certain embodiments, the UE measurement requirements may be altered or loosened in one or more steps until the measurement requirements reach the same or similar requirement as idle mode, discontinuous reception, or the like. For instance, in an embodiment, when S-RLF occurs, the method may include starting a timer, $T_{meas}$, and, while the $T_{meas}$ timer is running, continuing measurements according to the current requirements (i.e., nothing changes after S-RLF detection), such as for example, the "activated SCell" requirements. In some embodiments, upon start of $T_{meas}$ timer, the method may include sending an indication to a MeNB and/or SgNB of the current measurement results of detected cells. The indication may include, for example, the number of detected cells and their received power levels, suggested SgNB PCI/GCID along with measurement information, or an indication that no cell is detected at measured NR frequencies.

According to certain embodiments, when the $T_{meas}$ expires, the method may include starting utilizing different measurement requirements, such as "deactivated SCell" requirements or "DRX cycle=x ms" requirements. In an embodiment, the method may include altering the measurement requirements one or more times or in one or more steps towards "looser" requirements.

In some embodiments, the method may optionally include proposing the changes in measurement requirements to the network (e.g., to the SgNB and/or MeNB) prior to gradually altering or loosening the UE measurement requirements. According to certain embodiments, the method may include storing the transitions happening across different phases in a local buffer which may be optionally sent to the network in an uplink message. For example, in an embodiment, each time the UE changes its measurement requirements, the method may optionally include, at 560, indicating the change in measurement requirements to the MeNB and/or SgNB (e.g., via the MeNB leg). According to certain embodiments, the method may also optionally include, at 570, receiving a command or indication by the network to follow its own (the UE's) proposal for measurement requirements or to follow another track provided by the network.

In view of the above, embodiments of the invention provide several technical effects and/or improvements and/or advantages. For example, certain embodiments provide an advantageous approach for recovering from S-RLF during LTE-NR operation, which can, for example, improve performance and throughput of network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One embodiment is directed to a method that may include maintaining, by a network node, a UE measurement configuration information, deciding on actions for the UE to perform at SCG change, and receiving an indication, from the UE, when there is a change in the UE measurement requirements.

Another embodiment is directed to an apparatus that may include at least one processor and at least one memory including computer program code. The at least one memory and the computer program code are configured, with the at least one processor, to cause the apparatus at least to maintain a UE measurement configuration information, decide on actions for the UE to perform at SCG change, and receive an indication, from the UE, when there is a change in the UE measurement requirements.

Another embodiment is directed to a method that may include requesting, by a network node, a UE to indicate certain information upon S-RLF detection within uplink message to the network node. The method may also include indicating whether a certain measurement event is fulfilled for any NR neighbour cell, or whether the UE can detect any NR cell at all that meet the measurement event entry condition.

Another embodiment is directed to an apparatus that may include at least one processor and at least one memory including computer program code. The at least one memory and the computer program code are configured, with the at least one processor, to cause the apparatus at least to request a UE to indicate certain information upon S-RLF detection within uplink message to the network node, and to indicate whether a certain measurement event is fulfilled for any NR neighbour cell, or whether the UE can detect any NR cell at all that meet the measurement event entry condition.

Another embodiment is directed to a method that may include, in an LTE-NR configuration, after a S-RLF, gradually altering or loosening, by a UE, UE measurement requirements until the measurement requirements reach the loosest defined requirements. The method may also include proposing and/or indicating the change in measurement requirements to the MeNB and/or SgNB (e.g., via the MeNB leg). According to certain embodiments, the method may also include receiving, by the UE, a command or indication by the network (e.g., SgNB or MeNB) to follow its own proposal for measurement requirements or to follow another track provided by the network.

Another embodiment is directed to an apparatus that may include at least one processor and at least one memory including computer program code. The at least one memory and the computer program code are configured, with the at least one processor, to cause the apparatus at least to, in an LTE-NR configuration, after a S-RLF, gradually alter or loosen UE measurement requirements until the measurement requirements reach the loosest defined requirements. The at least one memory and the computer program code may be further configured, with the at least one processor, to cause the apparatus at least to propose and/or indicate the change in measurement requirements to the MeNB and/or SgNB (e.g., via the MeNB leg), and to receive a command or indication by the network (e.g., SgNB or MeNB) to follow its own proposal for measurement requirements or to follow another track provided by the network.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of example embodiments, reference should be made to the appended claims.

We claim:

1. An apparatus, comprising:
at least one processor; and
at least one memory comprising computer program code,
the at least one memory and computer program code configured, with the at least one processor, to cause the apparatus at least to
after a secondary radio link failure (S-RLF), continue, by the apparatus, measurements according to current requirements;
send an indication of results of the measurements to at least one of a master network node and secondary network node;
gradually alter, by the apparatus, the measurement requirements until the measurement requirements reach a loosest defined requirement; and
indicate the change in the measurement requirements to at least one of the master network node or the secondary network node,
wherein, to gradually alter the measurement requirements, the at least one memory and computer program code are further configured, with the at least one processor, to cause the apparatus at least to alter the measurement requirements in one or more steps until the measurement requirements reach a same or similar requirement as at least one of idle mode or discontinuous reception.

2. The apparatus according to claim 1, wherein the at least one memory and computer program code are further configured, with the at least one processor, to cause the apparatus at least to:
receive a second indication from the at least one of a master network node and secondary network node to follow the apparatus' own proposal for the measurement requirements or to follow another approach provided by the network.

3. The apparatus according to claim 1, wherein, to gradually alter the measurement requirements, the at least one memory and computer program code are further configured, with the at least one processor, to cause the apparatus at least to:
start a timer;
while the timer is running, continue the measurements according to the current requirements;
upon start of the timer, send the indication of results of the measurements to the master network node or the secondary network node,
wherein the indication comprises at least one of a number of detected cells and their received power levels, suggested secondary network node primary cell identification (PCI)/global cell identity (GCID) along with measurement information, or an indication that no cell is detected at measured new radio (NR) frequencies.

4. The apparatus according to claim 3, wherein the at least one memory and computer program code are further configured, with the at least one processor, to cause the apparatus at least to:
receive a configuration of the timer from the at least one of a master network node and secondary network node.

5. A method, comprising:
after a secondary radio link failure (S-RLF), continuing, by a user equipment (UE), measurements according to current requirements;
sending an indication of results of the measurements to at least one of a master network node and secondary network node;
gradually altering, by the user equipment (UE), the measurement requirements until the measurement requirements reach a loosest defined requirement; and
indicating the change in the measurement requirements to at least one of the master network node or the secondary network node,
wherein said gradually altering comprises altering the measurement requirements in one or more steps until the measurement requirements reach a same or similar requirement as at least one of idle mode or discontinuous reception.

6. The method according to claim 5, further comprising:
receiving, by the user equipment (UE), a second indication from the at least one of a master network node and secondary network node to follow the user equipment's (UEs) own proposal for the measurement requirements or to follow another approach provided by the network.

7. The method according to claim 5, wherein said gradually altering further comprises:
starting a timer;
while the timer is running, continuing the measurements according to the current requirements;
upon start of the timer, sending the indication of results of the measurements to the master network node or the secondary network node,
wherein the indication comprises at least one of a number of detected cells and their received power levels, suggested secondary network node primary cell identification (PCI)/global cell identity (GCID) along with measurement information, or an indication that no cell is detected at measured new radio (NR) frequencies.

8. The method according to claim 7, further comprising:
receiving a configuration of the timer from the at least one of a master network node and secondary network node.

* * * * *